US009303836B2

(12) United States Patent
Okamoto

(10) Patent No.: US 9,303,836 B2
(45) Date of Patent: Apr. 5, 2016

(54) LIGHT DISTRIBUTION CONTROL SYSTEM FOR VEHICLE HEADLAMP

(71) Applicant: ICHIKOH INDUSTRIES, LTD., Isehara-shi, Kanagawa-ken (JP)

(72) Inventor: Tomohiro Okamoto, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 51 days.

(21) Appl. No.: 13/845,753

(22) Filed: Mar. 18, 2013

(65) Prior Publication Data
US 2013/0279186 A1    Oct. 24, 2013

(30) Foreign Application Priority Data
Apr. 20, 2012 (JP) ................. 2012-096526

(51) Int. Cl.
*B60Q 1/00* (2006.01)
*F21S 8/10* (2006.01)
*B60Q 1/08* (2006.01)
*B60Q 1/14* (2006.01)

(52) U.S. Cl.
CPC ............. *F21S 48/1742* (2013.01); *B60Q 1/085* (2013.01); *B60Q 1/143* (2013.01); *B60Q 2300/056* (2013.01); *B60Q 2300/42* (2013.01)

(58) Field of Classification Search
CPC .. B60Q 1/0017; B60Q 1/0041; B60Q 1/0425; B60Q 1/045; B60Q 1/06; B60Q 1/085; B60Q 1/122; B60Q 1/18; B60Q 1/1415; B60Q 1/1423; B60Q 1/1446; F21S 48/1742; F21S 48/1705; F21S 48/17
USPC ............................................................ 362/466
See application file for complete search history.

(56) References Cited

U.S. PATENT DOCUMENTS

| 7,118,238 | B2 * | 10/2006 | Ishiguro ........................ 362/37 |
| 7,210,828 | B2 * | 5/2007 | Fukawa et ...................... 362/465 |
| 7,540,638 | B2 * | 6/2009 | Dassanayake et al. ........ 362/465 |
| 8,080,942 | B2 * | 12/2011 | Heider et al. ................... 315/77 |
| 8,648,535 | B2 * | 2/2014 | Tatara .............................. 315/81 |
| 2003/0031008 | A1 * | 2/2003 | Kobayashi ..................... 362/37 |
| 2006/0087856 | A1 * | 4/2006 | Sugimoto et al. .............. 362/466 |
| 2008/0103661 | A1 * | 5/2008 | Sugimoto et al. ............... 701/49 |

FOREIGN PATENT DOCUMENTS

| EP | 2 394 851 A2 | 12/2011 |
| JP | 2011-238378 A | 11/2011 |
| JP | 2011-255826 A | 12/2011 |

* cited by examiner

*Primary Examiner* — Anh Mai
*Assistant Examiner* — Matthew Peerce
(74) *Attorney, Agent, or Firm* — Foley & Lardner LLP

(57) ABSTRACT

A control unit 20 controls a lighting state of each of radiating portions 11 to 13 in accordance with the determined light distribution pattern, based on data indicative of a state forward of a vehicle. When a light distribution pattern for ADB being selected, the control unit 20 controls a driving portion 15 based on data indicative of a state forward of the vehicle to adjust a rotation angle of the radiating portion 12 for a beam for ADB. In a case of determining to switch a light distribution pattern for ADB to a light distribution pattern for driving, the control unit 20 enables lighting of the radiating portion 13 for a beam for driving on the condition that a rotation angle of the radiating portion 12 for a beam for ADB is confined to an angle in a predetermined range from the front side of the vehicle.

4 Claims, 4 Drawing Sheets

(a)  (b)  (c)

(a)  (b)

LIGHT DISTRIBUTION CONTROL SYSTEM FOR VEHICLE HEADLAMP

CROSS REFERENCE TO RELATED APPLICATIONS

This application claims priority of Japanese Patent Application No. 2012-096526 filed on Apr. 20, 2012. The contents of the application are incorporated herein by reference in their entirety.

BACKGROUND OF THIS INVENTION

1. Field of the Invention

The present invention relates to a light distribution control system for a vehicle headlamp and, in particular, to a light distribution control system for a headlamp for driving with an adaptive front-lighting system.

2. Description of the Related Art

Conventionally, in a light distribution control system for a vehicle headlamp, there has been known a method of switching various light distribution patterns in accordance to a state forward of a vehicle (for example, Japanese Unexamined Patent Application Publication No. 2011-255826 and Japanese Unexamined Patent Application Publication No. 2011-238378). Such a light distribution control system is provided with a light distribution pattern configured to irradiate a distant area, a light distribution pattern configured to irradiate a nearby area in terms of prevention of a glare given to other vehicles (for example, an oncoming vehicle), and the like. These light distributions may be formed independently by individual radiating portions prepared for respective light distribution patterns, or may be formed by forming one light distribution pattern by a predetermined radiating portion, forming another distribution pattern by another radiating portion by complementing a difference from the aforementioned distribution pattern, and synthesizing these patterns.

In these light distribution patterns, in order to achieve both reduction of glare and improvement of visual recognition, a light distribution pattern configured to shade a part where other vehicle exists has been known. In such a light distribution pattern, there has been known a method in which a light distribution pattern is tilted in the horizontal direction of the vehicle by rotating a radiating portion in the horizontal direction from the front side of the vehicle in accordance with the approach of an oncoming vehicle. Accordingly, both reduction of glare and improvement of visual recognition are achieved more effectively.

However, in the vehicle headlamp provided with such rotating-type radiating portions, due to limitation of layout for space saving or the like, only necessary radiating portion is configured in a rotatable manner while other radiating portion is fixedly arranged. Therefore, in a case of switching from a light distribution pattern by a radiating portion rotated in the horizontal direction of the vehicle to a light distribution pattern by other radiating portion, a radiating direction of a light distribution pattern could be greatly changed between before and after switching. In such a case, there is the possibility of giving a feeling of discomfort to a user due to great displacement caused to the high-intensity point within his or her visually-recognizable range.

SUMMARY OF THE INVENTION

The present invention has been achieved in view of the above-described situation, and an object thereof is to reduce a feeling of discomfort given to a user in association with switching of a light distribution pattern while achieving both reduction of glare and improvement of forward visual recognition.

A light distribution control system for a vehicle head lamp according to first aspect of the present invention, comprising:

a first radiating portion configured to form a first light distribution pattern by radiating light from a light source forward;

a driving portion configured to drive the first radiating portion to rotate in a horizontal direction of a vehicle;

a second radiating portion configured to form a second light distribution pattern by radiating light from a light source to a front side of the vehicle;

a data retrieving portion configured to retrieve data indicative of a state forward of the vehicle;

a lighting controlling portion configured to determine a light distribution pattern based on data retrieved by the data retrieving portion and control lighting states of the first radiating portion and the second radiating portion in accordance with said light distribution pattern; and a rotation controlling portion configured to control the driving portion based on data retrieved by the data retrieving portion to adjust a rotation angle of the first radiating unit in a case where the first light distribution pattern is selected, wherein in a case where switching from the first light distribution pattern to the second light distribution pattern is determined, the lighting controlling portion enables lighting of the second radiating portion on the condition that a rotation angle of the first radiating portion is confined to an angle within a predetermined range from the front side of the vehicle.

The light distribution control system for a vehicle headlamp according to second aspect of the present invention, wherein in the first aspect, the lighting controlling portion performs light modulation and lighting by lighting the second radiating portion while increasing its lighting rate at a predetermined light modulation rate after lighting of the second radiating portion is enabled.

The light distribution control system for a vehicle headlamp according to third aspect, wherein in the second aspect, the lighting controlling portion sets a timing to start the light modulation and lighting based on rotation speed by the driving portion and a light modulation rate of the second radiating portion so that a timing that a rotation angle of the first radiating portion returns to the front side of the vehicle corresponds to a timing that a lighting rate of the second radiating portion reaches a rated value.

According to the present invention, lighting of the second radiating portion is enabled on the condition that a rotation angle of the first radiating portion is confined to an angle within a predetermined range from the front side of the vehicle. This prevents a case where a radiating direction of a light distribution pattern is greatly changed between before and after switching from the first light distribution pattern to the second light distribution pattern. This prevents a case where the high-intensity point within user's visually-recognizable range is greatly displaced. As a result, a feeling of discomfort given to a user in association with switching of a light distribution pattern can be reduced while achieving both reduction of glare and improvement of forward visual recognition.

DESCRIPTION OF THE PREFERRED EMBODIMENTS

Figure 1:
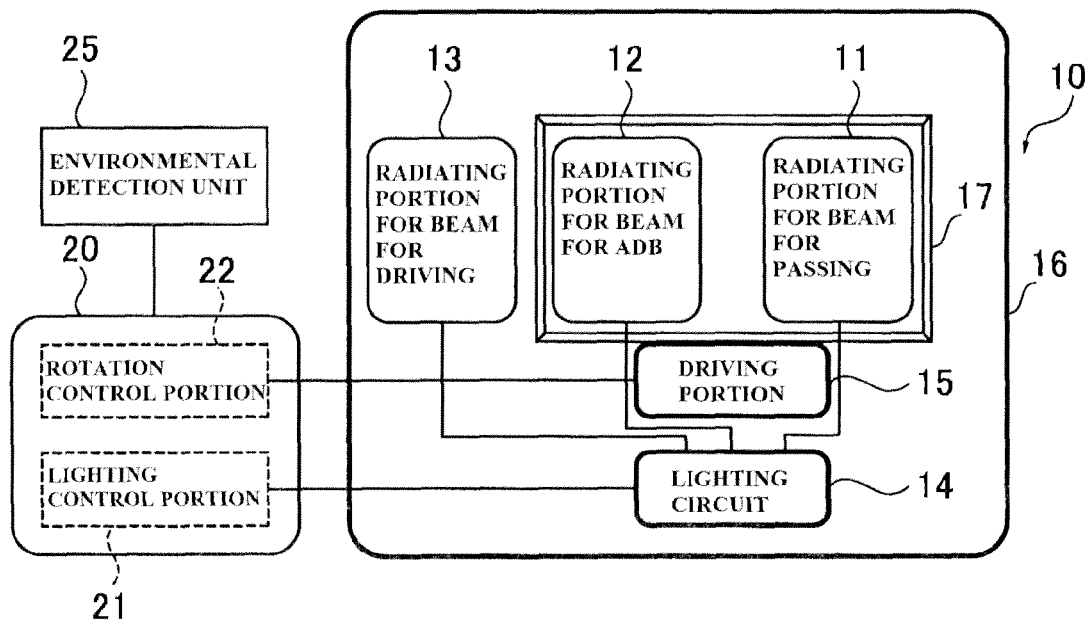
FIG. 1 is a block diagram showing a schematic structure of a light distribution control system for a vehicle headlamp.

FIG. 1 is a block diagram showing a schematic structure of a light distribution control system for a vehicle headlamp according to the present embodiment. The light distribution control system for the vehicle headlamp according to the present embodiment is configured so that various light distribution patterns can be switched in the vehicle headlamp. Herein, prior to explanation for a detailed structure and operation of the light distribution control system, light distribution patterns will be explained.

Figure 2:
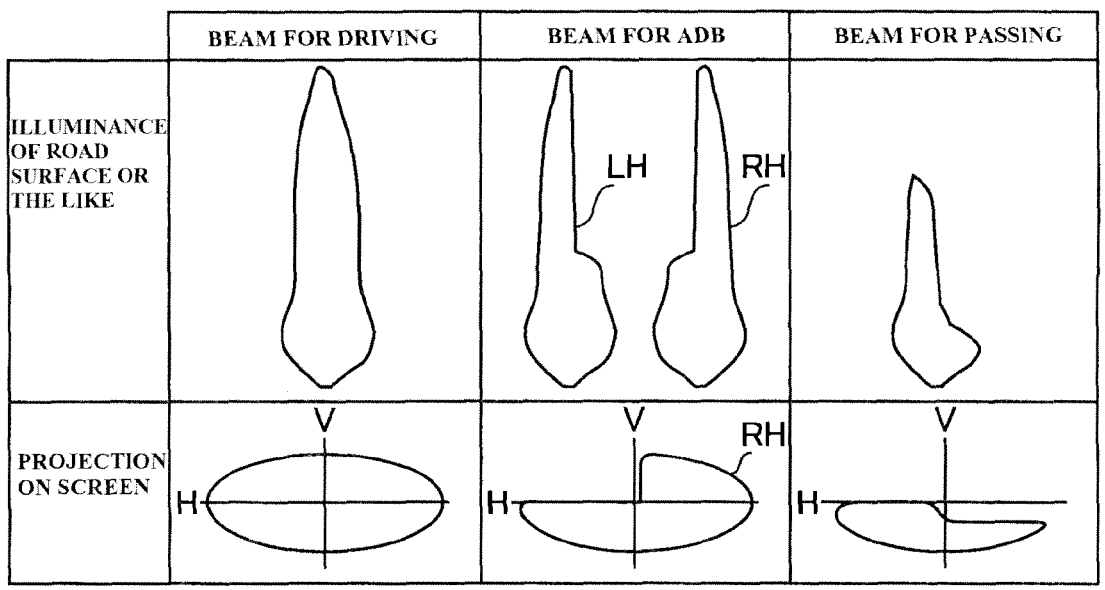
FIG. 2 is an explanatory view showing light distribution patterns.

FIG. 2 is an explanatory view showing light distribution patterns. As a light distribution pattern, the light distribution control system according to the present embodiment contains, for example, a beam for driving, a beam for ADB (Adaptive Driving Beam), and a beam for passing.

A beam for driving has the same light distribution pattern between left and right headlamps. As shown in "illuminance of road surface or the like", in a case where the beam for driving is caught in a horizontal plane, the pattern is substantially transversely symmetrical in the longitudinal direction of the beam for driving. Specifically, the beam for driving has a shape which widens gradually to the maximum width and then narrows gradually up to the front end as it extends away from the headlamp side as a start point. Furthermore, as shown in projection on screen, in a case where the beam for driving is caught in a vertical plane, it has an elliptical shape which is wide in the horizontal direction (H) and narrow in the vertical direction (V).

A beam for ADB has a light distribution pattern similar to that of the beam for driving, which has a line-symmetric relation between left and right headlamps, with respect to the center line extending in the direction from front to rear of the vehicle. In FIG. 2, "LH" designates a light distribution pattern by the left headlamp while "RH" designates a light distribution pattern by the right headlamp (the same goes for FIG. 4 to be described later). For example, in a case where the beam for ADB by the right headlamp is caught in a horizontal plane, it is shaped so that part of the right margin is cut from a shape of the beam for driving. Specifically, the beam for ADB has a shape which widens once, then gets gouged greatly in the left margin, and narrows a distance to the right margin up to the front end as it extends away from the headlamp as a start point. Furthermore, in a case where the beam for ADB by the right headlamp is caught in a vertical plane, it is shaped so that the upper left part is missing from the beam for driving.

A beam for passing has the same light distribution pattern between the left and right headlamps. In a case where the beam for passing is caught in a horizontal plane, it has a shorter distance in a radiating direction as compared to the beam for driving or the beam for ADB. Furthermore, the beam for passing has a shape which widens once, then gets gouged greatly in the right margin, and narrows a distance to the left margin up to the front end as it extends away from the headlamp as a start point. Furthermore, in a case where the beam for passing is caught in a vertical plane, it is shaped so that the top part is missing from an elliptical shape which is wide in the horizontal direction (H) and is narrow in the vertical direction (V).

Figure 3:
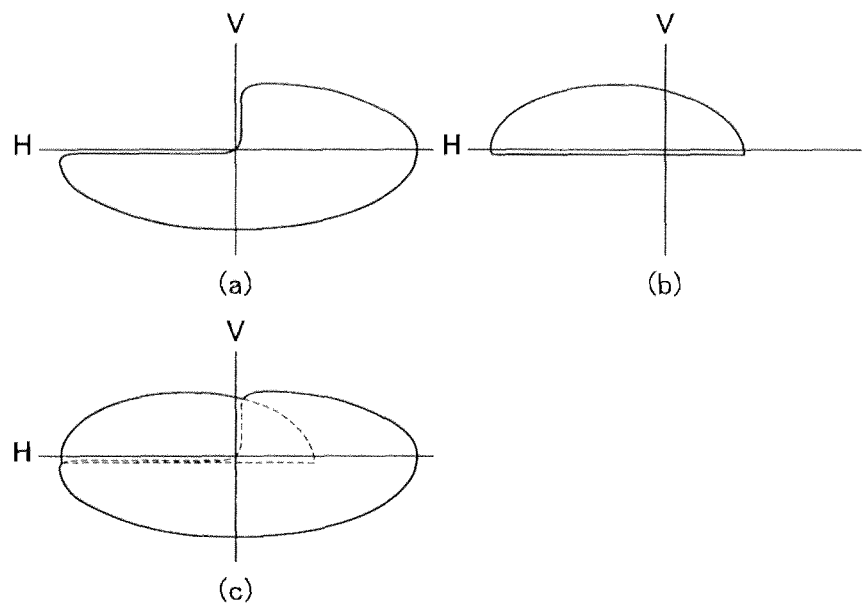
FIG. 3 is an explanatory view showing a synthetically-generated light distribution pattern.

As for these various light distribution patterns, a plurality of light distribution patterns may be formed by selectively lighting separate radiating portions and then synthesizing light distribution patterns. For example, as shown in FIG. 3, the beam for driving ((c) in FIG. 3) can be formed by synthesizing the beam for ADB ((a) in FIG. 3) and the beam ((b) in FIG. 3) obtained by additionally lighting another radiating portion. However, a plurality of light distribution patterns may be formed using a single radiating portion by shifting a shade within a lighting unit, or individual radiating portions are prepared for respective light distribution patterns to form a plurality of light distribution patterns using individual radiating portions by forming light distribution patterns using radiating portions, respectively.

It is to be noted that explanation is made using these three light distribution patterns in the present embodiment. However, a light distribution pattern is not limited to these patterns and a beam having another light distribution pattern may be used.

Referring back to FIG. 1, the light distribution control system for the vehicle headlamp is mainly made up of a lighting unit 10 as a headlamp and a control unit 20.

The lighting unit 10 is mainly made up of a radiating portion 11 for a beam for passing, a radiating portion 12 for a beam for ADB, a radiating portion 13 for a beam for driving, a lighting circuit 14, and a driving unit 15, and these elements are housed in a lighting housing 16. The radiating portion 11 for a beam for passing and the radiating portion 12 for a beam for ADB are fixedly mounted on one frame 17 while having a mutual positional relation that keeps a certain position on the basis of the frame 17. The frame 17 is mounted on the lighting housing 16 on the basis of a reference angle at which radiating directions of the radiating portion 11 for a beam for passing and the radiating portion 12 for a beam for ADB are directed to the front side of the vehicle while being configured so as to be rotatable in the horizontal direction of the vehicle from the front side of the vehicle. That is, the radiating portion 11 for a beam for passing and the radiating portion 12 for a beam for ADB are also rotated in synchronization with rotation of the aforementioned frame 17. On the other hand, the radiating portion 13 for a beam for driving is fixedly mounted to the lighting housing 16 on the basis of a reference angle at which its radiating direction is directed to the front side of the vehicle. Meanwhile, it does not mean that the radiating portion 13 for a beam for driving is absolutely fixed, so that it can be allowed to rotate within a predetermined movable range, such as optical axis adjustment, for example.

The radiating portion 11 for a beam for passing has a light source and forms a beam for passing by radiating light from this light source forward (forward on the basis of the frame 17).

The radiating portion 12 for a beam for ADB has a light source and forms a beam for ADB by radiating light from this light source forward (forward on the basis of the frame 17). This radiating portion 12 for a beam for ADB may form a light distribution pattern corresponding to a difference between the beam for ADB and the beam for passing shown in FIG. 2 so as to form the beam for ADB by synchronizing the light distribution pattern corresponding to the aforementioned difference and the beam for passing formed by the radiating portion 11 for a beam for passing. However, the radiating portion 12 for a beam for ADB may form independently a light distribution pattern corresponding to the beam for ADB, and in a case of forming the beam for ADB, only part of the beam or the entire beam may be formed.

The radiating portion 13 for a beam for driving has a lighting source and forms a beam for driving by radiating light from this lighting source forward (the front side of a vehicle). This radiating portion 13 for a beam for driving may form a light distribution pattern corresponding to a difference between the beam for driving and the beam for ADB shown in FIG. 2 so as to form the beam for driving by synchronizing the light distribution pattern corresponding to the aforementioned difference and the beam for ADB formed by the radiating portion 12 for a beam for ADB and the radiating portion 11 for a beam for passing (see FIG. 3). However, the radiating portion 13 for a beam for driving may form independently a light distribution pattern corresponding to the beam for driving, and in a case of forming the beam for driving, only part of the beam or the entire beam may be formed.

The lighting circuit 14 lights and extinguishes a light source for each of the radiating portions 11 to 13. Furthermore, the lighting circuit 14 is capable of performing light modulation and lighting by lighting the radiating portion 13 for a beam driving while increasing a lighting rate of the light source in the radiating portion 13 for a beam for driving, at a predetermined light modulation rate.

The driving portion 15 drives the frame 17, that is, the radiating portion 11 for a beam for passing and the radiating portion 12 for a beam for ADB, to rotate in the horizontal direction of the vehicle. For example, the driving portion 15 is made up of a driving means such as an electric motor and a power-transmitting mechanism such as a gear.

The control unit 20 bears the function of controlling light distribution of the vehicle headlamp. As the control unit 20, a microcomputer which is mainly made up of CPU, ROM, RAM, I/O interface, and the like can be used. The control unit 20 performs various computations in accordance with a control program stored in ROM, and controls an operation state of the light distribution control system based on the computation results.

Specifically, the control unit 20 determines a light distribution pattern in accordance with a state forward of the vehicle. The control unit 20 outputs a control signal in accordance with the determined light distribution pattern to the lighting circuit 14 to control a lighting state of each of the radiating portions 11 to 13 by lighting or extinguishing them (a lighting control portion 21). In a case where a beam for ADB has been selected as a present light distribution pattern, the control unit 20 controls the driving portion 15 based on a state forward of the vehicle to thereby adjust a rotation angle of the frame 17, that is, the radiating portion 11 for a beam for passing and the radiating portion 12 for a beam for ADB (a rotation control portion 22).

Figure 4:
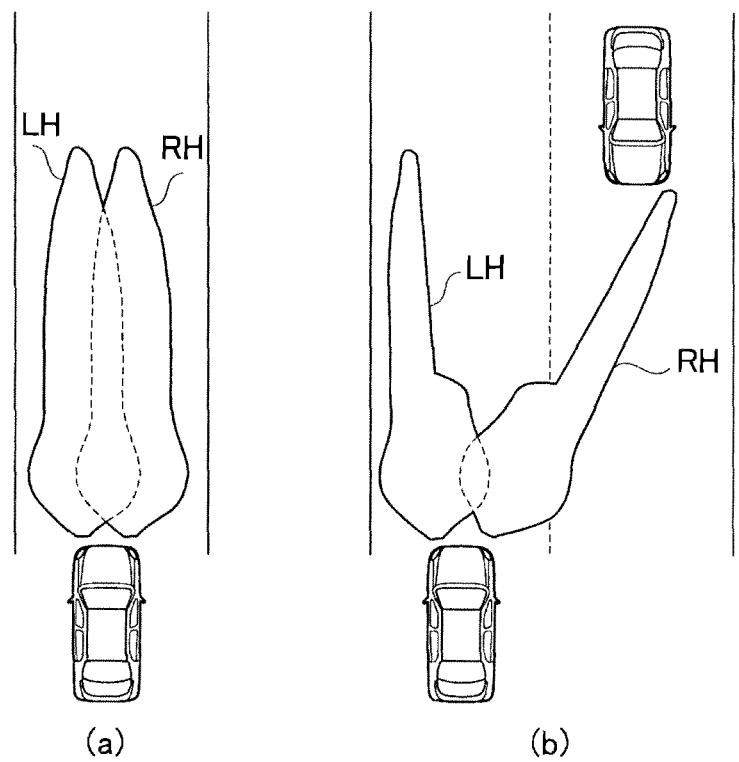
FIG. 4 is an explanatory view showing an exemplary case of switching a light distribution pattern in accordance with a road state forward of a vehicle.

FIG. 4 is an explanatory view showing an exemplary case of switching a light distribution pattern in accordance with a road state forward of the vehicle. In the example shown in FIG. 4, the state forward of the vehicle is based on the assumption that an oncoming vehicle as other vehicle is approaching.

First, as shown in FIG. 4(a), the vehicle is driving on a straight road, and in a case of no vehicle oncoming or a vehicle with an enough distance, the control unit 20 determines a beam for driving as a light distribution pattern. In this case, the light distribution patterns LH, RH by the left and right vehicle headlamps form a beam for driving. With this beam for driving, visual recognition of the front side of the vehicle can be secured.

On the other hand, in a case where the oncoming vehicle has approached, the control unit 20 determines a beam for ADB as a light distribution pattern. In this case, the light distribution patterns LH, RH by the left and right vehicle headlamps are switched from a beam for driving to form a beam for ADB (see FIG. 4(b)). Furthermore, when the oncoming vehicle has approached the vehicle, an angle of the oncoming vehicle as seen from the vehicle is tilted in the right direction. Thus, the control unit 20 adjusts rotation angles of the radiating portion 11 for a beam for passing and the radiating portion 12 for a beam for ADB in the right headlamp of the vehicle, in accordance with the approach state of the oncoming vehicle. Accordingly, a tilt of a beam for ADB by the right headlamp is adjusted so that the forward side (the side of the vehicle) of the oncoming vehicle is irradiated with a beam for ADB by the right headlamp of the vehicle while the oncoming vehicle is sandwiched between beams for ADB by the left and right headlamps. The light distribution patterns LH, RH made up of the beams for ADB by the left and right headlamps are shaped so that the center region is gouged to allow only the front and back sides of the oncoming vehicle to be irradiated, thereby securing as much visual recognition as a beam for driving while reducing glare given to the oncoming vehicle. It is to be noted that rotation angles of the radiating portion 11 for a beam for passing and the radiating portion 12 for a beam for ADB in the left headlamp may be adjusted so that the back side of the oncoming vehicle is irradiated with not only a beam for ADB by the right headlamp but also a beam for ADB by the left headlamp.

As one of characteristics of the present embodiment, in a case of determination to switch from a beam for ADB to a beam for driving, the control unit 20 enables lighting of the radiating portion 13 for a beam for driving on the condition that a rotation angle of the radiating portion 12 for a beam for ADB is confined to an angle within a predetermined range from the front side of the vehicle. That is, even in a case of determination to switch a beam for ADB to a beam for driving, the control unit 20 does not enable lighting of the radiating portion 13 for a beam for driving and maintains lighting of a beam for ADB in a state where a rotation angle of the radiating portion 12 for a beam for ADB is larger than an angle within a predetermined range from the front side of the vehicle.

The control unit 20 is connected to an environmental detection unit 25. This environmental detection unit 25 I is configured by combining more than one sensor of various types such as a camera and a laser radar, for example, and processes a signal obtained from these sensors to send output to the control unit 20. The control unit 20 retrieves this output from the environmental detection unit 25 as data indicative of a state forward of the vehicle, and based on this data, recognizes a state forward of the vehicle such as other vehicle (an oncoming vehicle, for example) surrounding the vehicle.

Figure 5:
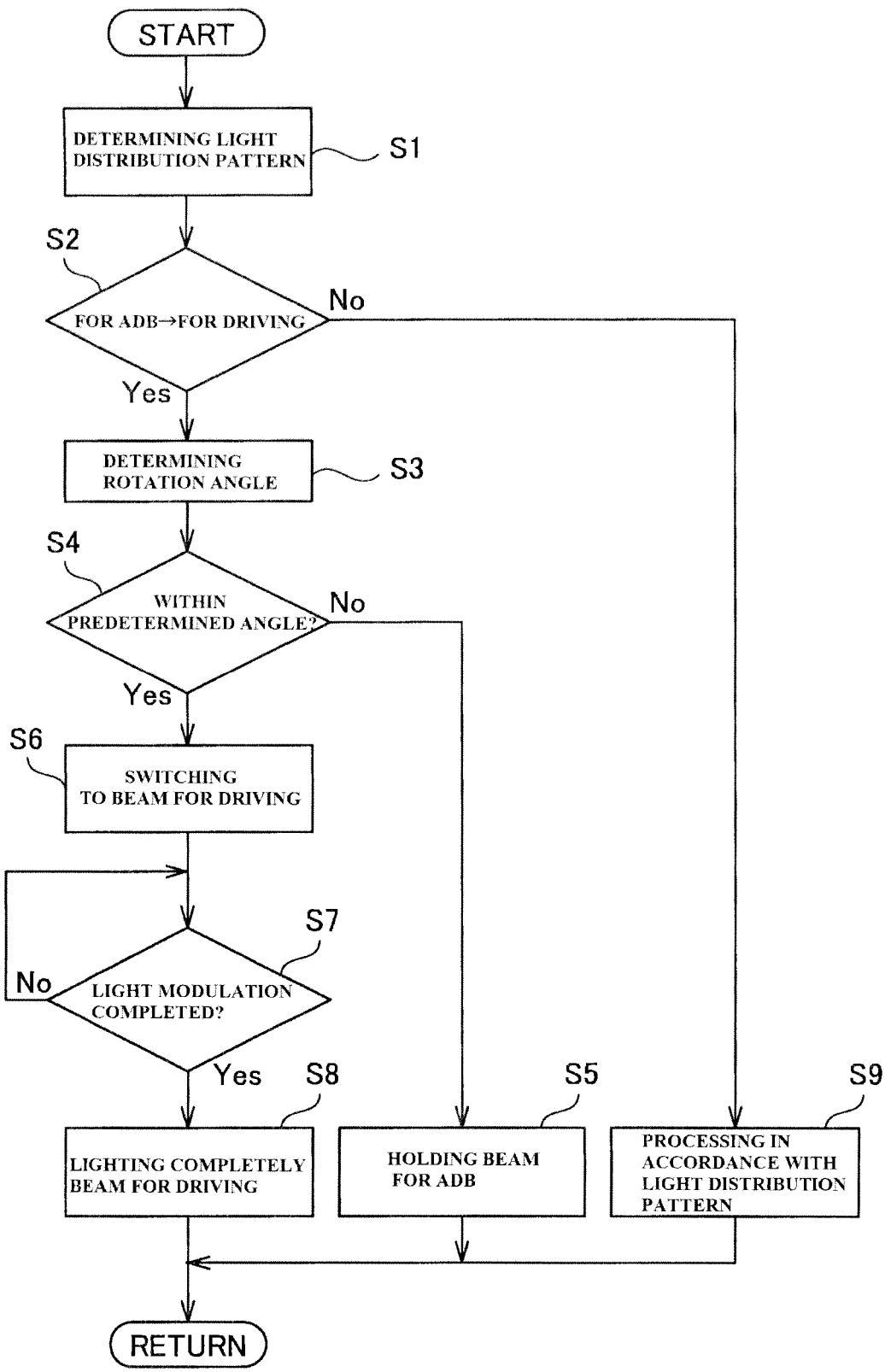
FIG. 5 is a flowchart showing a sequence of steps related to switching control of a light distribution pattern.

FIG. 5 is a flowchart showing a sequence of steps related to switching control of a light distribution pattern according to the present embodiment. The processes shown in this flowchart are performed with a predetermined period by the control unit 20 on the condition that a beam for ADB has been selected as a light distribution pattern. In a case where a light distribution pattern is switched to a beam for driving or a beam for passing by user's operation (instruction) during performance of the processes shown in this flowchart, the control unit 20 controls a lighting state of each of the radiating portions 11 to 13 in accordance with user's operation.

First, in step 1 (S1), the control unit 20 determines how to control a light distribution pattern in this routine based on data indicative of a state forward of the vehicle.

In step 2 (S2), the control unit 20 judges whether it is necessary to switch the light distribution pattern from a beam for ADB to a beam for driving. As a background of switching a light distribution pattern from a beam for ADB to a beam for driving, such a case is assumed that the oncoming vehicle disappears before passing through the vehicle, for example, the oncoming vehicle turns left or right.

In a case of positive judgment in step 2, that is, in a case where it is necessary to switch a light distribution pattern from a beam for ADB to a beam for driving, a routine proceeds to step 3 (S3). On the other hand, in a case of negative judgment in step 2, that is, in a case where it is unnecessary to switch a light distribution pattern from a beam for ADB to a beam for driving, a routine proceeds to a process in step 9 (S9) described later. In this step 2, an example case of negative judgment is such that a light distribution pattern is held without any change to a beam for ADB or a light distribution pattern is switched from a beam for ADB to a beam for passing.

In step 3, the control unit 20 determines a rotation angle of the frame 17, that is, rotation angles of the radiating portion 11 for a beam for passing and the radiating portion 12 for a beam for ADB. This rotation angle can be determined based on a control signal output to the driving portion 15, and corresponds to a tilt in a radiating direction of a beam for ADB with respect to the front side of the vehicle.

In step S4 (S4), the control unit 20 determines whether a rotation angle is confined to a predetermined angle, that is, a rotation angle is confined to an angle within a predetermined range from the front side of the vehicle. Herein, an angle within predetermined range is set to be symmetrical in the horizontal direction from the front side of the vehicle, and as described later, the optimum value is set in advance through experiments and simulations from the point of view of reducing a feeling of discomfort given to a user due to a gap in a radiating direction of each beam at the time of switching from a beam for ADB to a beam for driving.

In a case of negative judgment in step S4, that is, in a case where a rotation angle is larger than an angle within a predetermined range from the front side of the vehicle, the routine proceeds to step 5 (S5). On the other hand, in a case of positive judgment in step 4, that is, a rotation angle is confined to an angle within a predetermined range from the front side of the vehicle, the routine proceeds to step 6 (S6).

In step S5, the control unit 20 holds a beam for ADB without switching the light distribution pattern to a beam for driving. The control unit 20 sets a target rotation angle to the front side of the vehicle (a reference angle) so that the radiating portion 11 for a beam for passing and the radiating portion 12 for a beam for ADB are faced to the front side of the vehicle. The control unit 20 then outputs to the driving portion 15 a control signal corresponding to a difference between a present rotation angle and a target rotation angle.

On the other hand, in step 6, in a case of performing a process in this step for the first time in response to the first positive judgment made in step 4, the control unit 20 switches a lighting pattern from a beam for ADB to a beam for driving. That is, the control unit 20 enables lighting of the radiating portion 13 for a beam for driving. In this case, the control unit 20 performs light modulation and lighting by lighting the radiating portion 13 for a beam driving while increasing a light volume of the light source in the radiating portion 13 for a beam for driving, at a predetermined light modulation rate.

Figure 6:
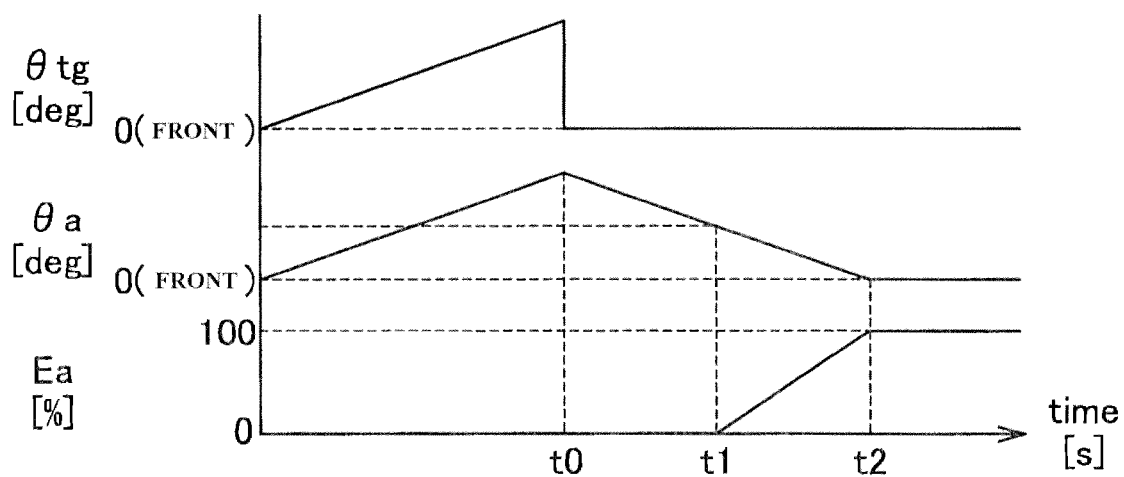
FIG. 6 is an explanatory view showing a relation between a beam rotation angle and a transition of lighting rates of a radiating portion for a beam for driving.

In this light modulation and lighting, timing t1 to start lighting is set in advance based on rotation speed by the driving portion 15 and a light modulation rate of the radiating portion 13 for a beam for driving. Specifically, as shown in FIG. 6, this timing t1 is set in advance so that a timing that lighting rate Ea of the radiating portion 13 for a beam for driving reaches a rated value (for example, lighting rate of 100%) corresponds to timing t2 that a beam rotation angle θa returns to a target rotation angle θtg (for example, 0). It is to be noted that in FIG. 6, the timing t0 indicates a timing that the oncoming vehicle disappears.

In step 7 (S7), the control unit 20 determines whether light modulation has been completed, that is, whether lighting rate Ea has reached a rated value. In a case of positive judgment in this step 7, that is, in a case where light modulation has been completed, the routine proceeds to step 8 (S8). On the other hand, in a case of negative judgment in step 7, that is, in a case where light modulation has not been completed yet, the routine returns to this process.

In step 8, the control unit 20 lights completely the radiating portion 13 for a beam for driving.

On the other hand, in step 9 subsequent to the negative judgment in step 2, the control unit 20 performs a process in accordance with each light distribution pattern. Specifically, the control unit 20 holds a present lighting state of each of the radiating sections 11 to 13, and holds a beam for ADB without no change or switches a light distribution pattern to a beam for passing by, for example, extinguishing the radiating portion 12 for a beam for ADB.

As described above, according to the light distribution control system for the vehicle headlamp in the present embodiment, the control unit 20 determines a light distribution pattern based on data indicative of a state forward of the vehicle, and controls a lighting state of each of the radiating portions 11 to 13 in accordance with the determined light distribution pattern. In a case of a light distribution pattern for ADB being selected, the control unit 20 adjusts a rotation angle of the radiating portion 12 for a beam for ADB by controlling the driving portion 15 based on data indicative of a state forward of the vehicle. In a case of determining to switch from a light distribution pattern for ADB to a light distribution pattern for driving, the control unit 20 enables lighting of the radiating portion 13 for a beam for driving on the condition that a rotation angle of the radiating portion 12 for a beam for ADB is confined to an angle within a predetermined range from the front side of the vehicle.

According to the above configuration, in a case where a rotation angle of the radiating portion 12 for a beam for ADB is not confined to an angle within a predetermined range from the front side of the vehicle, lighting of the radiating portion 13 for a beam for driving is disabled. Therefore, even in a case of switching a light distribution pattern from a beam for ADB to a beam for driving in a situation where the radiating portion 12 for a beam for ADB is rotated in the horizontal direction of the vehicle, the radiating portion 13 for a beam for driving configured to form a beam for driving is not lit. Furthermore, lighting of the radiating portion 13 for a beam for driving is enabled on the condition that a rotation angle of the radiating portion 12 for a beam for ADB is confined to an angle within a predetermined range from the front side of the vehicle, thereby preventing a case where a radiating direction of a light distribution pattern is greatly changed between before and after switching from a beam for ADB to a beam for driving. This prevents a case where the high-intensity point within user's visually-recognizable range is greatly displaced. As a result, a feeling of discomfort given to a user in association with switching of a light distribution pattern can be reduced while achieving both reduction of glare and improvement of forward visual recognition.

Furthermore, in the present embodiment, after enabling lighting of the radiating portion 13 for a beam for driving, the control unit 20 performs light modulation and lighting by lighting the radiating portion 13 for a beam for driving while increasing its lighting rate at a predetermined light modulation rate.

As described later, in a case where the radiating portion 13 for a beam for driving is completely lit after enabling its lighting, there is a possibility of giving a feeling of discomfort to a user due to a slight gap between the front side of the vehicle and a radiating direction when lighting is started. In this regard, according to the present embodiment, the gap in a radiating direction can be prevented by light modulation by performing light modulation and lighting, so that a feeling of discomfort given to a user can be reduced effectively.

Furthermore, in the present embodiment, the control unit 20 sets the timing t1 to start light modulation and lighting, based on rotation speed by the driving portion 15 and a modulation rate of the radiating portion 13 for a beam for driving so that a timing that a rotation angle of the radiating portion 12 for a beam for ADB returns to the front side of the vehicle corresponds to a timing that the lighting rate of the radiating portion 13 for a beam for driving reaches a rated vale.

According to the above configuration, complete lighting of the radiating portion 13 for a beam for driving and return of rotation angle of the radiating portion 12 for a beam for ADB to the front side of the vehicle correspond in terms of timing, so that a light distribution pattern can seem to change naturally. Thus, a feeling of discomfort given to a user can be reduced effectively.

Figure 7:
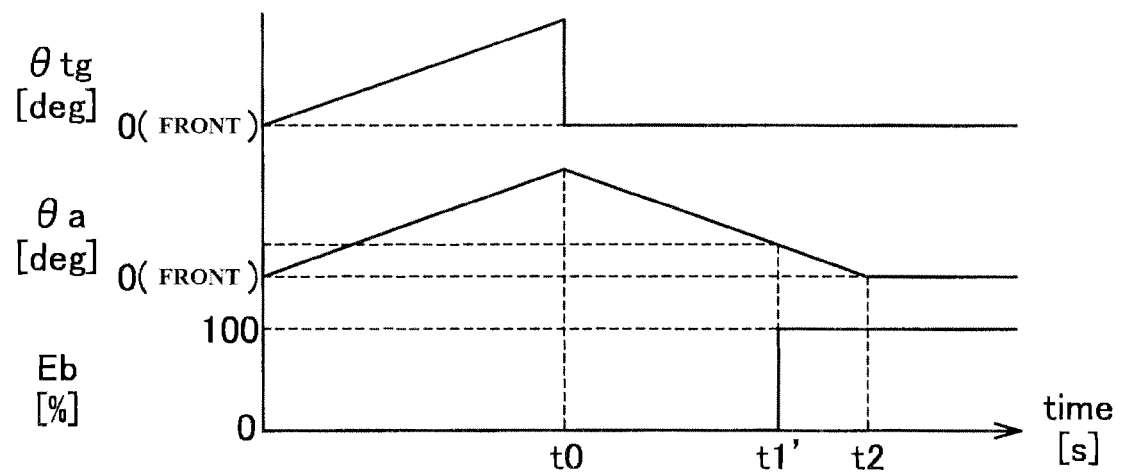
FIG. 7 is an explanatory view showing a relation between the beam rotation angle and a timing of lighting the radiating portion for a beam for driving.

In the above-described embodiment, both light modulation and lighting are performed to the radiating portion 13 for a beam for driving in a case where lighting of the radiating portion 13 for a beam for driving is enabled. However, as shown in FIG. 7, an extinguish state may be uniformly switched to a completely-lit state. In this case, however, an angle within a predetermined range from the front side of the vehicle, which is used for comparison with a rotation angle, is preferably set to be smaller than that in light modulation and lighting. Accordingly, a feeling of discomfort given to a user can be reduced. By this method, a degree of a discomfort feeling given to a user can be greatly reduced as compared to a conventional method.

Furthermore, in the present embodiment, an oncoming vehicle was mentioned as an example of a state forward of a vehicle. However, such a state is not limited to the oncoming vehicle and may be a vehicle ahead, a shape of a road ahead, a driving environment of a vehicle, and the like. Furthermore, the environmental detection unit 25 may retrieve data from a navigation system, or data such as a vehicle speed and an angle of a steering wheel as long it bears the function as an data retrieving portion configured to retrieve data indicative of a state forward of a vehicle.

As described above, the light distribution control system for the vehicle headlamp according to the present invention has been described. However, it is needless to say that the technical scope of the present invention is not limitative to the scope set forth in the foregoing embodiments and a variety of modifications can be added in the technical scope of the present invention.

What is claimed is:

1. A light distribution control system for a vehicle head lamp, comprising:
   a first radiating portion configured to form a first light distribution pattern by radiating light from a light source forward;
   a driving portion configured to drive the first radiating portion to rotate in a horizontal direction of a vehicle;
   a second radiating portion configured to form a second light distribution pattern, different from a light distribution pattern formed by the first radiating portion, by radiating light from a light source to a front side of the vehicle in a direction directly forward of the vehicle from the second radiating portion, wherein the second light distribution pattern is substantially transversely symmetric about the direction directly forward of the vehicle and has a maximum luminance in the direction directly forward of the vehicle;
   a data retrieving portion configured to retrieve data indicative of a state forward of the vehicle;
   a controller comprising a lighting controlling portion and a rotation controlling portion;
   the lighting controlling portion configured to determine a light distribution pattern based on data retrieved by the data retrieving portion and control lighting states of the first radiating portion and the second radiating portion in accordance with said light distribution pattern; and
   the rotation controlling portion configured to control the driving portion based on data retrieved by the data retrieving portion to adjust a rotation angle of the first radiating portion in a case where the first light distribution pattern is selected, wherein
   when the controller determines that switching from the first light distribution pattern to the second light distribution pattern is to be performed,
   the lighting controlling portion is configured to enable lighting of the second radiating portion on the condition that a rotation angle of the first radiating portion is less than any angle within a predetermined range from the front side of the vehicle, and
   the lighting controlling portion is configured to not enable lighting of the second radiating portion on the condition that the rotation angle of the first radiating portion is greater than any angle within the predetermined range from the front side of the vehicle.

2. The light distribution control system for a vehicle headlamp according to claim 1, wherein
   the lighting controlling portion performs light modulation and lighting by lighting the second radiating portion while increasing its lighting rate at a predetermined light modulation rate after lighting of the second radiating portion is enabled.

3. The light distribution control system for a vehicle headlamp according to claim 2, wherein
   the lighting controlling portion sets a timing to start the light modulation and lighting based on rotation speed of the first radiating portion by the driving portion and a light modulation rate of the second radiating portion so that a timing that a rotation angle of the first radiating portion returns to the front side of the vehicle corresponds to a timing that a lighting rate of the second radiating portion reaches a rated value.

4. The light distribution control system for a vehicle headlamp according to claim 1, wherein the first light distribution pattern is an adaptive driving beam.

* * * * *